C. B. HOARD.
Clock Winder.
No. 1,140.
Reissued Feb. 19, 1861.
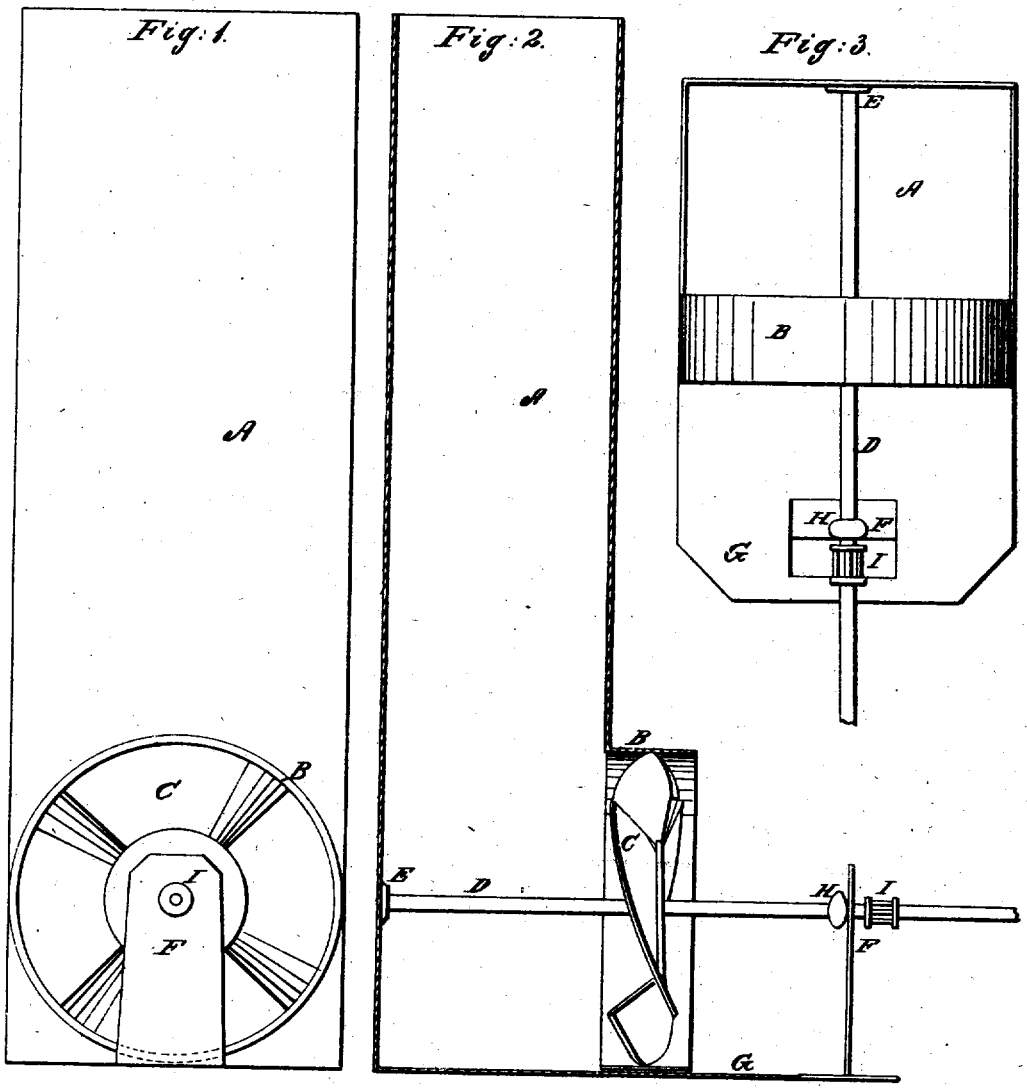
Witnesses:
J Dennis Jr
Edw. F. Brown
Inventor:
C B Hoard.
N. PETERS, Photo-Lithographer, Washington, D. C.

UNITED STATES PATENT OFFICE.

CHARLES B. HOARD, OF WATERTOWN, NEW YORK.

IMPROVED METHOD OF WINDING TIME-KEEPERS BY CURRENTS OF AIR.

Specification forming part of Letters Patent No. 27,721, dated April 3, 1860; Reissue No. 1,140, dated February 19, 1861.

*To all whom it may concern:*

Be it known that I, CHARLES B. HOARD, of Watertown, in the county of Jefferson and State of New York, have invented a new and useful Improvement in Winding Clocks or other Time-Pieces; and I do hereby declare that the same is described and represented in the following specification and drawings, in which the same letters indicate like parts in each of the figures.

Figure 1 is an elevation of my apparatus for winding up the weights or springs which propel clocks or other time-pieces. Fig. 2 is a sectional elevation of the same. Fig. 3 is a plan or top view.

The nature of my invention and improvement consists in winding the spring or weight of a clock or other time-piece by connecting it with an air-wheel or other air-motor, so constructed and arranged as to be actuated by currents of air caused to flow through an artificial channel.

To illustrate my invention, I herein describe and represent in the drawings, one modification of apparatus for the purpose.

In the several figures of the drawing, A is a pipe or flue open at the top and closed at the bottom, with a circular opening in one side surrounded by a circular flange, B, for the passage of the currents of air that move the wind-wheel C, which wheel is mounted on a shaft, D, that turns in the box E, fastened to one side of the pipe A, and having its other bearing in the standard F, fastened to the extension of the bottom plate, G, as shown in the drawings. The shaft D has a collar, H, on it to prevent it from traversing through the standard F. The pinion I is fastened to the shaft D, so as to be turned by the wind-wheel C and drive the first of a train of wheels to reduce the motion sufficient to give power to turn the shaft, which is connected with the spring or weight of a clock.

The machinery for winding may be attached in whole or in part to the clock or other time-piece. Various kinds of motors moved by a current of air, such as are well known to mechanicians, may be employed for the purpose of winding, and the vanes or fans of the motors may be made to change position by the action of the air upon them, so that the air-wheel will move in the same direction by currents passing alternately in opposite directions.

It is obvious that my improvement must be so applied that the power which moves the train of wheels in the clock or time-piece is maintained during the process of winding. This is accomplished by winding a spring, as it is done in many watches that have no chain or a weight, by a plan such as that invented by Hazzard Knowles.

In the choice of an air-motor, I prefer to make it of light materials so as to render it sensitive to action or restraint, and it is obvious that a stop should be employed to prevent overwinding, as is common in time-keepers; but this stop may be so arranged as to operate upon the air-motor, or upon any other part of the winding-machinery.

What I claim as my invention, and desire to secure by Letters Patent, is—

Winding a clock or other time-keeper by means of a current of air produced by a pipe-flue or other artificial channel employed for ventilation, or otherwise actuating an air-motor.

C. B. HOARD.

Witnesses:

JOHN S. HOLLINGSHEAD,

J. J. GREENOUGH.